(12) United States Patent  
Harding et al.

(10) Patent No.: US 8,734,700 B2  
(45) Date of Patent: May 27, 2014

(54) METHOD AND APPARATUS FOR THE PRODUCTION OF HIGH TENACITY POLYOLEFIN SHEET

(75) Inventors: Kenneth C. Harding, Midlothian, VA (US); Gene C. Weedon, Richmond, VA (US)

(73) Assignee: E I Du Pont de Nemours and Company, Wilmington, DE (US)

( * ) Notice: Subject to any disclaimer, the term of this patent is extended or adjusted under 35 U.S.C. 154(b) by 714 days.

(21) Appl. No.: 12/319,321

(22) Filed: Jan. 6, 2009

(65) Prior Publication Data

US 2010/0295203 A1  Nov. 25, 2010

Related U.S. Application Data

(63) Continuation-in-part of application No. 12/080,197, filed on Apr. 1, 2008, now Pat. No. 7,854,870.

(51) Int. Cl.  
*B29C 43/24* (2006.01)

(52) U.S. Cl.  
CPC ........................................ *B29C 43/24* (2013.01)  
USPC ........ 264/288.4; 264/119; 264/125; 264/126; 425/6; 425/143; 425/223; 425/224; 425/324.1; 425/363; 425/404; 425/445; 425/447

(58) Field of Classification Search  
CPC ..................................................... B29C 43/24  
USPC ........... 264/119, 125, 126, 288.4; 425/6, 143, 425/223, 224, 324.1, 363, 404, 445, 447  
See application file for complete search history.

(56) References Cited

U.S. PATENT DOCUMENTS 4,436,682 A * 3/1984 Knopp ............................ 264/70  
6,951,685 B1 * 10/2005 Weedon et al. ................ 428/364

* cited by examiner

*Primary Examiner* — Galen Hauth

(57) ABSTRACT

A process for the production of virtually full density polyolefin suitable for further processing by drawing to form a high tenacity, highly oriented polyolefin sheet comprising: a) feeding a metered amount of polyolefin powder into the nip between two vertically stacked and heated calender rolls through application of the polyolefin powder to the apex of the topmost of the two heated calender rolls; b) rolling the powder through the nip until a coherent sheet of polyolefin sheet is produced: and c) once a coherent polyolefin sheet exits the nip adjusting the temperature in the nip to obtain specific tensile and elongation properties. Apparatus for the performance of such a process is also described.

7 Claims, 5 Drawing Sheets

METHOD AND APPARATUS FOR THE PRODUCTION OF HIGH TENACITY POLYOLEFIN SHEET

This application is a Continuation-in-Part of U.S. patent application Ser. No. 12/080,197 filed Apr. 1, 2008 now U.S. Pat. No. 7,854,870 which is incorporated herein by reference in its entirety.

FIELD OF THE INVENTION

The present invention relates to ultra high molecular weight polyethylene (UHMWPE) and other high molecular weight polyolefin materials useful for ballistic applications and more particularly to a novel and highly economical process for their production.

BACKGROUND OF THE INVENTION

The processing of ultra high molecular weight polyethylene (UHMWPE), i.e. polyethylene having a molecular weight in excess of about 2 million, is known in the polymer arts to be extremely difficult. Products made from such materials are, however, very strong, tough and durable.

In the following series of U.S. Patents filed by Kobayashi et al and assigned to Nippon Oil Co., Ltd. a number of inventions related to the fabrication of fibers and films of polyolefins generally and UHMWPE specifically, are described: U.S. Pat. Nos. 4,996,011, 5,002,714, 5,091,133, 5,106,555, 5,200,129, and 5,578,373. The processes described in these patents generally describe the continuous production of high strength and high modulus polyolefin films by feeding polyolefin powder between a combination of endless belts disposed in an up and down opposing relationship, compression molding the polyolefin powder at a temperature below its melting point between the endless belts and then rolling and stretching the resultant compression molded polyolefin into an oriented film. As compression molded, the sheet is relatively friable thus requiring the subsequent calendering or drawing operations to provide an oriented film that exhibits very good strength and durability properties. In fact, the strength of such materials produced by these processes can be 3 times that of steel on a weight basis and they exhibit very low creep.

Enhanced processes for the production of such materials have also been described in the following U.S Patents and patent applications: U.S. Pat. No. 7,348,053 and U.S. patent application Ser. No. 11/217,279 fled Sep. 1, 2005.

A common element of all of these prior art processes is that they require compaction of an UHMWPE powder as the initial step in the production process. Until now, it has been the thinking of the UHMWPE manufacturing community that such powder compaction was necessary in order to place the material in a form that it could be subsequently rolled and drawn as described in the referenced prior art. Stated differently, it has been the thinking that in order to produce the product in a process involving the subsequent rolling and drawing steps to obtain the orientation required for the production of ballistically useful UHMWPE, the powder had to first be placed in the form of a sheet that demonstrated sufficient tenacity to be successfully processed in such subsequent rolling and drawing processes. In the prior art, such a form was obtained by compacting the powder into a relatively friable sheet that could be introduced into the rolling operation for subsequent processing.

The performance of this compaction process step, particularly in the production of UHMWPE sheets wider than 1-2 inches in width, requires the use of relatively massive, quite complex and very expensive equipment (measured in the millions of dollars for installed such equipment). Such equipment thus requires high levels of capital expenditures for installation and due to its complexity ongoing high operating and maintenance expenses.

U.S. Pat. No. 4,436,682 to Knopp, issued Mar. 13, 1984 describes a process for compacting polymer powders into fully dense products. According to this patent, a polymer powder is fed from a hopper into the nip between two rolls, compacted therein at a temperature below the melting point of the polymer powder and withdrawn from the nip under tension to form a "fully dense" polymer sheet. According to Knopp, when his process is applied to an UHMWPE powder, the resulting sheet has a density of about 0.82 g/cc which he designates as "substantially fully dense". It is well known that the density of UHMWPE is on the order of above 0.945 g/cc. Hence, the product of Knopp's process is hardly "fully dense" and is unsuited to further processing by calendering or drawing, since it will tear or break when subjected to such processes.

It would thus be of great benefit to the producer of such UHMWPE materials, particularly in widths greater than a couple of inches, if a much simpler, smaller and less expensive first process step could be substituted for the powder compaction step, without negatively affecting the either the product thus produced or significantly affecting the kinetics of the process, i.e. it did not, for example, slow production to an uneconomical rate.

OBJECT OF THE INVENTION

It is therefore an object of the present invention to provide an enhanced process for the production of UHMWPE sheet that eliminates the need for the previously described compaction step and uses a much more cost effective and simpler process for the production of a high tenacity UHMWPE sheet that can undergo subsequent processing by drawing.

SUMMARY OF THE INVENTION

According to the present invention, there is provided a process for the production of virtually full density polyolefin suitable for further processing by drawing to form a high tenacity, highly oriented polyolefin sheet comprising: a) feeding a metered amount of polyolefin powder into the nip between two vertically stacked and heated calender rolls through application of the polyolefin powder to the apex of the topmost of the two heated calender rolls; b) rolling the powder through the nip until a coherent sheet of polyolefin sheet is produced: and c) once a coherent polyolefin sheet exits the nip adjusting the temperature in the nip to obtain specific tensile and elongation properties. Apparatus for the performance of such a process is also described. Such a process not only eliminates the need for a separate and costly compaction step, but yields a coherent polyolefin sheet that is ready for drawing in accordance with prior art processes for the production of a high tenacity, highly oriented polyolefin sheet having a high heat of fusion. According to a preferred embodiment of the present invention, the polyolefin of choice is ultra high molecular weight polyethylene (UHMWPE).

DETAILED DESCRIPTION

In the description that follows, operating parameters, material properties etc. are presented in the context of those for ultra high molecular weight polyethylene (UHMWPE), but it will be readily understood by the skilled artisan in the polymer field that the invention described herein is readily applicable to other polyolefin polymers such as high molecular weight polypropylene through the judicious selection of materials and process conditions appropriate for these other polyolefin materials.

The term "tape" as used herein refers to products having widths on the order of or greater than about ½ inch and preferably greater than 1 inch. The term "fiber" as used herein is meant to define a "narrow" tape, i.e. an element narrower than about ½ inch. The term "slit film fiber" refers specifically to a "fiber" or narrow tape made in accordance with the present invention that exhibits a generally rectangular cross-section and smooth, i.e. non-serrated or ragged edges. The terms "sheet" and "film" as used herein is meant to refer to thin sections of the materials of the present invention in widths up to and exceeding 160 inches in width as could be produced in large commercial equipment specifically designed for production in such widths. According to a preferred embodiment, such sheets and tapes have a generally rectangular cross-section and smooth edges. Hence, the fundamental difference between a "tape", a "slit film fiber", a "fiber", a "film" and a "sheet" as used to describe the products of the processes described herein relates to the width thereof and is generally independent of the thickness thereof.

Figure 1:
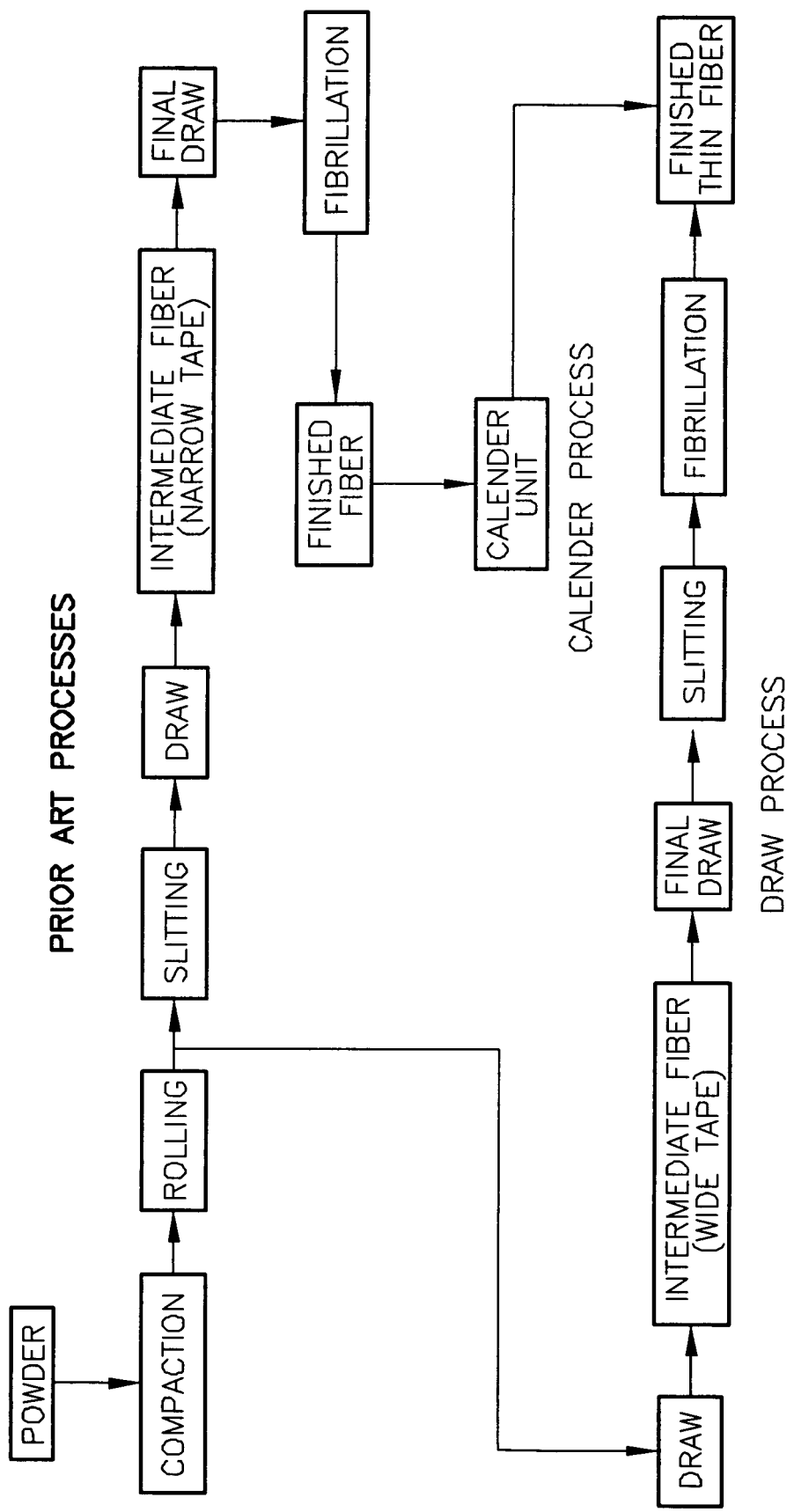
FIG. 1 is a schematic representation of the production processes of the prior art.

Referring now to FIG. 1, the processes described in the prior art and depicted schematically in FIG. 1 comprised the continuous production of high strength and high modulus polyolefin films by feeding polyolefin powder between a combination of endless belts disposed in an up and down opposing relationship, compacting the polyolefin powder at a temperature below its melting point between the endless belts and then rolling and stretching the resultant compression molded polyolefin into an oriented film. To the extent of their relevance to the modified processes described herein, the aforementioned prior art descriptions contained in U.S. Pat. Nos. 4,996,011, 5,002,714, 5,091,133, 5,106,555, 5,200,129, and 5,578,373. are incorporated herein by reference in their entirety.

A major difference between the processes of the prior art and those of the present invention is that the present invention obviates the need for the compaction step and its related high cost entirely. Thus, the method described herein begins with heated polyolefin powder introduced as described hereinafter directly into a pair of heated, counter rotating calender rolls under very specific temperature and gap conditions to produce a coherent polyolefin sheet suitable for subsequent further drawing to orient the polyolefin and to produce a ballistically useful high tenacity, highly oriented polymeric material.

According to a preferred embodiment of the present invention, the polyolefin processed in accordance with the process of the present invention is an UHMWPE that exhibits high crystalinity (above about 80% as determined by differential scanning calorimetry), a heat of fusion equal to or greater than 220 joules/gram and low levels of entanglement. Thus, it is preferred that the input starting material UHMWPE possess the degree of crystallinity and heat of fusion and meet the low entanglement requirements stated above. Such commercially available materials as Ticona X-168 from Ticona Engineeing Polymers, 2600 Updike Road, Auburn Hills Mich. 48236 and type 1900 CM from Basell Corp. 2801 Centerville Road, Wilmington, Del. 19808 are useful in the successful practice of the present invention.

Figure 3:
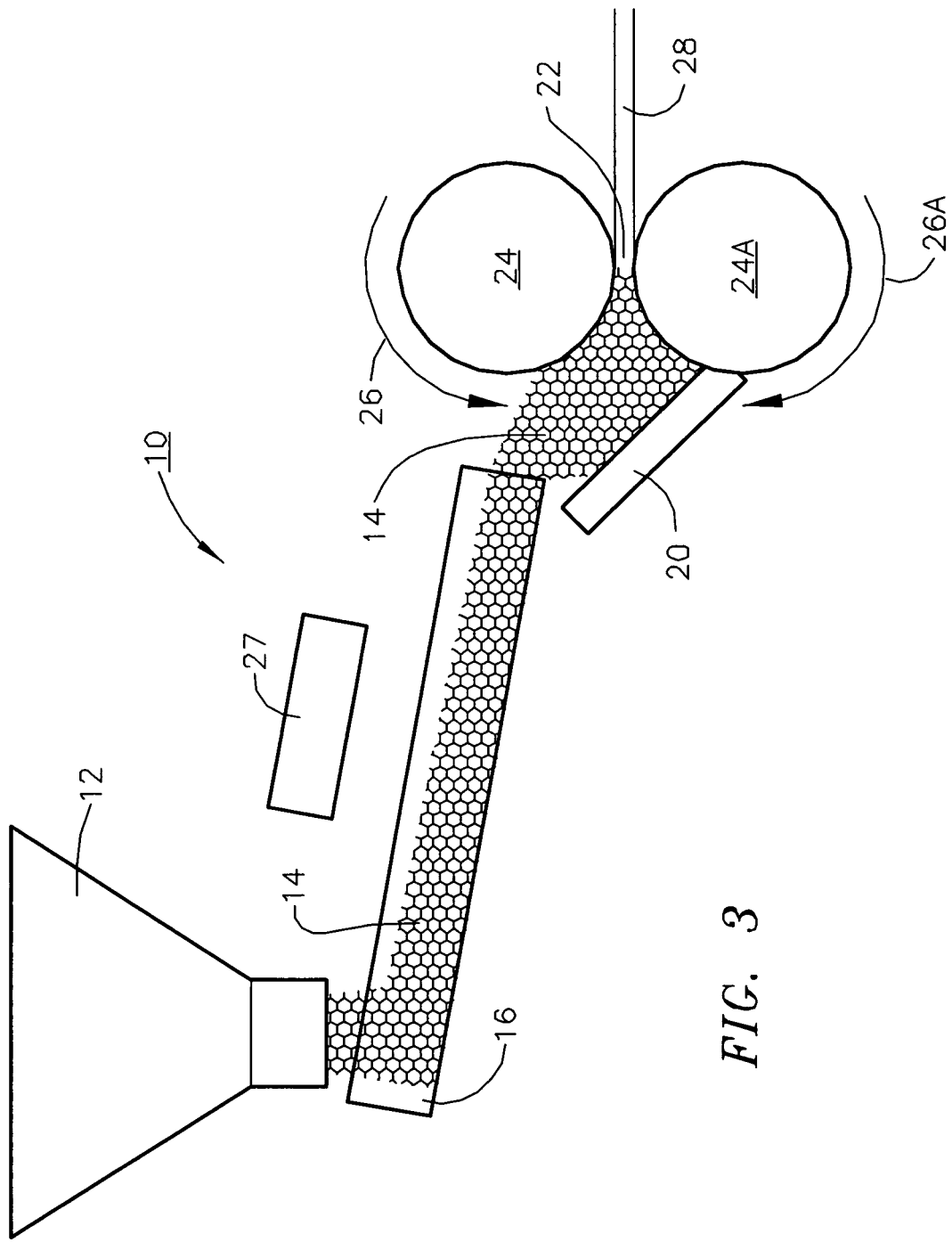
FIG. 3 is a schematic side view of the apparatus used to produce coherent UHMWPE sheet in accordance with the present invention.

Referring now to the accompanying drawings, as depicted in FIG. 3, the initial step in the process of the present invention utilizes a direct roll apparatus 10 comprising a polymer powder hopper 12 that feeds a metered amount of polymer powder 14 into a vibratory chute 16 via a metering device 18 and thence to a containment plate 20. At containment plate 20 the powder is introduced into the gap 22 between two counter rotating heated calender rolls 24 and 24A rotating in the directions shown by arrows 26 and 26A. A heater 27 preferably an infrared heater, imparts heat to powder 14 as described more fully below. Heater 28 is preferably located from about 2 to about 8 inches above powder 14 in vibratory chute 16 and set at a temperature of between about 160 and 220° F. These distances and temperatures will, of course, be variable depending upon the particular polymer powder 14 being processed, and the type of heater used, but have been found suitable for the processing of the preferred UHMWPE. As powder 14 cascades down vibratory chute 16 onto containment plate 20 it builds to a point where it is drawn into gap 22.

According to a preferred embodiment of one aspect of the present invention, at the start of the direct roll process, gap 22 is set narrower than the size of the smallest individual polymer powder particle, for example at about 50μ. Gap 22 may, of course, be widened if the minimum particle size of polymer powder 14 is greater than 50μ. In this instance, successful practice is preferably accomplished by heating rolls 24 and 24A to a higher initial temperature than if gap 22 is set below the minimum particle size of polymer powder 14. Similarly, at start up of the direct rolling process described herein, heated calender rolls 24 and 24A are preferably heated to a temperature above the melting point of polymer powder 14. While this melting point will be dependent upon the particular material being processed, in the case of the preferred UHMWPE starting materials described elsewhere herein this initial temperature is about 149° C. or about 3° C. above the melting point of the preferred UHMWPE. Lower temperatures could, of course, be appropriate for lower melting polyolefin materials. At this point, rolling of powder 14 is initiated. As soon as a coherent sheet of polymer 28 begins to emerge from gap 22 the temperature of calender rolls 24 and 24A is reduced to below the melting point of polymer powder 14 and gap 22 is increased to that desired for the final product thickness for coherent sheet 28. As used herein, the term "coherent sheet" is meant to define a polymer sheet that is suitable for further processing by drawing without tearing, ripping or otherwise becoming unusable in such additional processing. For all practical purposes, such a sheet will be virtually fully dense such as in the case of the preferred UHMWPE materials described herein having a density above about 0.945 g/cc. For the preferred UHMWPE powders 14 described elsewhere herein the operating temperature (the temperature after formation of a coherent sheet 28 is in the range of from about 136 to about 144° C. and preferably between about 139 and about 141° C., and the operating gap is on the order of 100µ and 230µ and preferably at about 140µ. It should be noted that the initial and operating temperatures recited herein are not necessarily set points for the polymer powder/sheet in nip 22, but rather surface temperatures of heated calender rolls 24 and 24A.

While the operating speed of the apparatus just described will vary with the particular polyolefin being processed, using the preferred UHMWPE materials described above, start up roll speeds of between about 1.9 to about 4.0 meters per minute have been found acceptable. Steady state operation of the apparatus is generally within the range of between about 2.0 and about 12.0 meters per minute. It should be noted that these operating speeds are based primarily on ones ability to take up coherent sheet 28 and the size of heated calendar rolls 24 and 24A, since larger rolls will generally tend to increase the surface in contact with the polymer in nip 22. Thus, if downstream operations or take up apparatus are capable of faster speeds, or larger diameter rolls are used, higher operating speeds for the direct roll process just described are possible.

Figure 4:
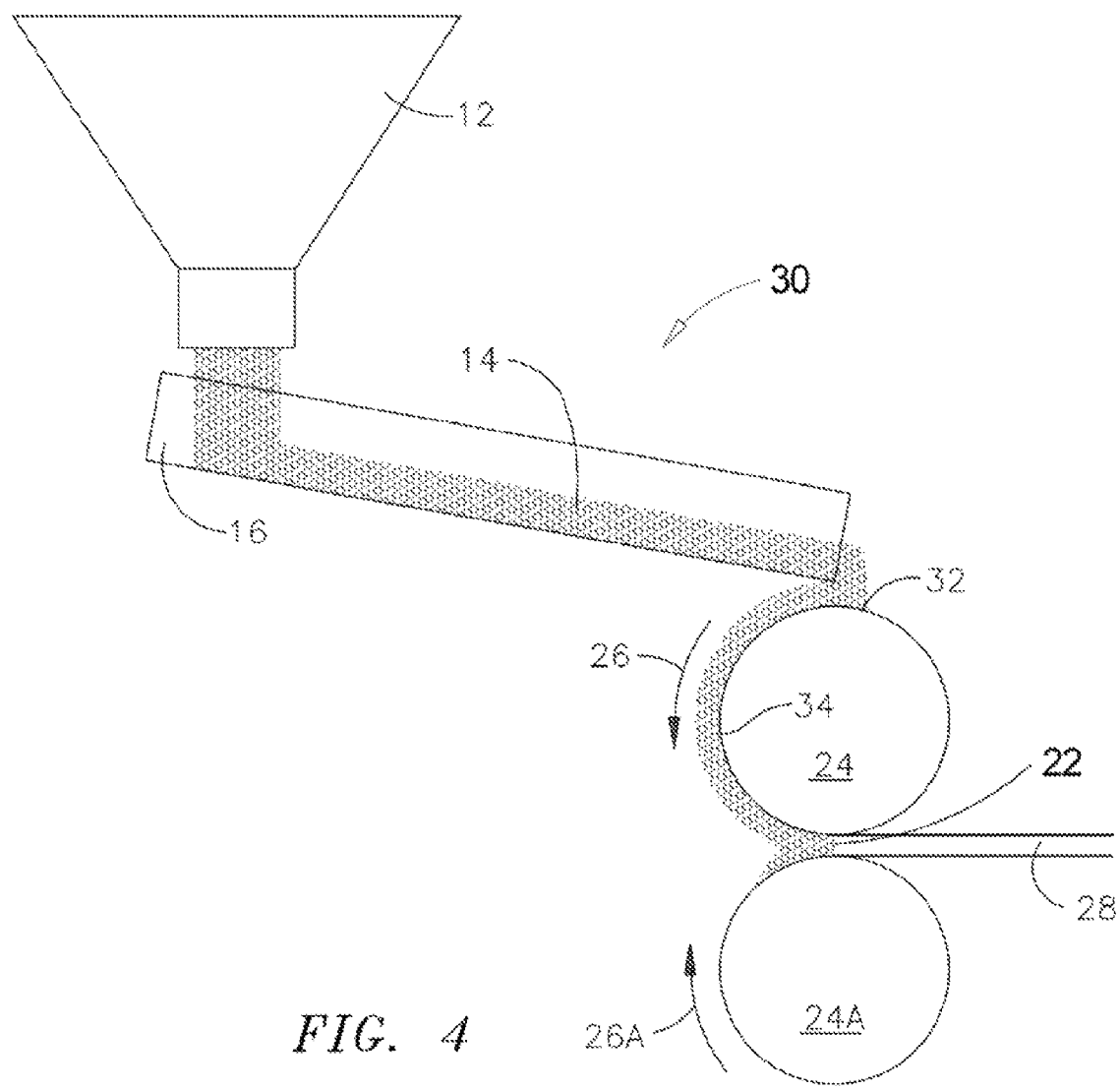
FIG. 4 is a schematic side view of an alternative preferred embodiment of an apparatus used to produce coherent UHMWPE sheet in accordance with the present invention.
Figure 5:
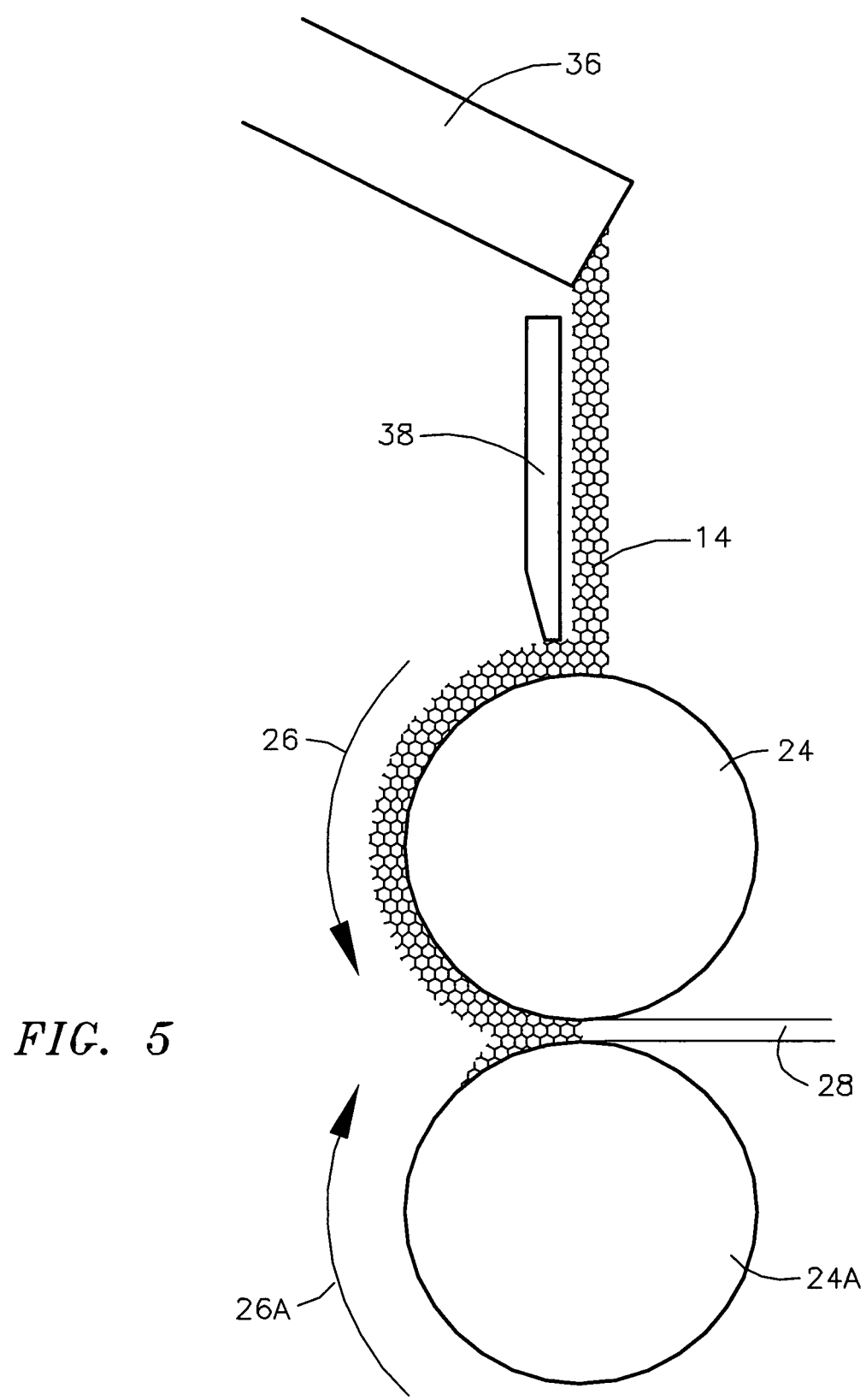
FIG. 5 is a schematic side view of yet another alternative preferred embodiment of an apparatus used to produce coherent UHMWPE sheet in accordance with the present invention.

While the apparatus depicted in FIG. 3 produces an entirely satisfactory product, certain modifications of the feed system as depicted in FIGS. 4 and 5 can be made with equally satisfactory, and, in some instances further improved results as described below. As discussed hereinafter, certain process parameters such as the temperature of the rolls and the gap in the nip can be varied when these alternative feed system configurations are used, but otherwise the process and apparatus are essentially as described above.

In the modified feed system apparatus 30 shown in FIG. 4, the vertical positioning of rolls 24 and 24A is essentially as shown in FIG. 3. As shown in this Figure, the feed system comprises a hopper or other source of UHMWPE or other polymer 12 that meters the flow of polymer powder 14 to a transfer chute 16 that may comprise a vibratory chute, screw drive or the like to deliver a metered amount of polymer powder 14. The distinction between this feed system and that described in connection with FIG. 3, is that instead of feeding polymer powder 14 directly into the nip or gap 22 between heated calender rolls 24 and 24A, polymer powder 14 is controllably applied in the vicinity of the apex 32 of top roll 24 wherefrom it is drawn on the surface 34 of top roll 24 in the direction shown by arrow 26 which is the direction of rotation of heated calender roll 24. In order for such transfer on the surface of heated calender roll 24, heated calender roll 24 must be maintained at a temperature such that the applied polymer 14 is at or near its incipient melting point, i.e. the temperature at which the onset of melt is detected as determined by differential scanning calorimetry (DSC). This temperature can and will, of course, vary widely depending upon the polymer powder 14 being introduced and the temperature at which it exhibits the onset of melt. In the embodiments depicted in FIGS. 4 and 5, start up is preferably performed with gap 22 set at a depth necessary to yield the thickness of the desired coherent polymer sheet product 28 as distinguished from the smaller gap settings specified for the alternative feed systems described above. Since the polymer powder is applied at apex 32 and roll 24 is set to address polymer powder 14 at a temperature that is at or approaching the onset of melt, a wider gap setting may be used at start up since polymer powder 14 already being "softened" as it travels around surface 34 will tend to "agglomerate" or "thicken" and form a sheet shape of the appropriate thickness as it passes through gap 22 even if gap 22 is set at a depth greater than that of the smallest particle of polymer powder 14. It should be noted that the laydown of polymer powder 14 on roll 24 does not have to be exact across the width of roll 24 at apex 32 since the polymer powder will tend to redistribute along nip or gap 22 to form a sheet of the desired width so long as the polymer feed is provided in accordance with and related to the width requirements of coherent sheet 28.

Referring now to FIG. 5, the feed system depicted in this Figure includes a metering mechanism such as a screw drive or vibratory chute for feeding a metered amount of polymer powder 14 whose application in the vicinity of apex 32 of roll 24 is controlled through the use of a doctor blade 38 that controls the thickness of the applied layer of polymer powder 14. Otherwise, the apparatus is similar to that depicted in FIGS. 3 and 4.

As alluded to hereinabove, it is important to the successful practice of the present invention that roll 24 be maintained at a temperature at or near the onset of melt of the particular polymer being processed as determined by DSC. Thus, while, for example, UHMWPE polymers can be processed at temperatures between about 130° C. and about 145° C. Operating temperatures for roll 24 in the various embodiments depicted herein of from about 12° C. below the onset of melt to about 8° C. above the onset of melt have proven useful for a variety of UHMWPE powders. Operating temperatures in the range of from about 8° C. below to about 4° C. above the onset of melt for a particular polymer are preferred and most preferred are operating temperatures in the range of from about 2° C. above to about 2° C. below the onset of melt for the particular polymer being processed as determined by differential scanning calorimetry. The operating speeds for the apparatus depicted in FIGS. 4 and 5 are generally similar to those for the apparatus depicted n FIG. 3 as previously described. Start up temperatures between about +1° C. and –1° C. and preferably within the range of from about +½° C. and –½° C. of the onset of melt for the particular polymer being processed as determined by DSC are specifically preferred but not essential to the successful practice of the present invention.

A major advantage of the use of the apparatus and process described in connection with FIGS. 4 and 5 is that significantly higher tensile values (plus about 10%) can be obtained using the arrangement and process just described.

The products of the just described processes are virtually full dense and translucent UHMWPE sheets, i.e. an UHMWPE sheets having a density of about 0.95 to about 0.98 g/cc.

While the apparatus used to practice the process of the present invention is depicted herein as vertically oriented, the process will operate equally well in a vertical configuration, i.e. with the polymer powder being fed to gap 22 between two horizontally parallel calender rolls 24 and 24A. In this orientation, powder 14 is metered from a heated hopper located above horizontally parallel calender rolls 24 and 24A so that powder 24 is fed from above into gap 22 and the product sheet 28 is drawn from below gap 22. All other operating procedures, i.e. temperature control and gap setting variations remain the same.

While not critical to the successful practice of the present invention, and clearly variable depending upon the particular polyolefin being processed, roll surface roughnesses of from about 4 to about 8 RMS have been found suitable for the processing of the preferred UHMWPE materials described herein.

Post-processing of coherent sheet 28 to obtain a highly useful UHMWPE ballistic sheet, film, tape or fiber is performed in much the same fashion as and in apparatus similar to that described in issued U.S. Pat. No. 7,348,053, issued Mar. 25, 2008, i.e. by drawing coherent sheet 28 which are referred to and incorporated herein in their entirety.

Figure 2:
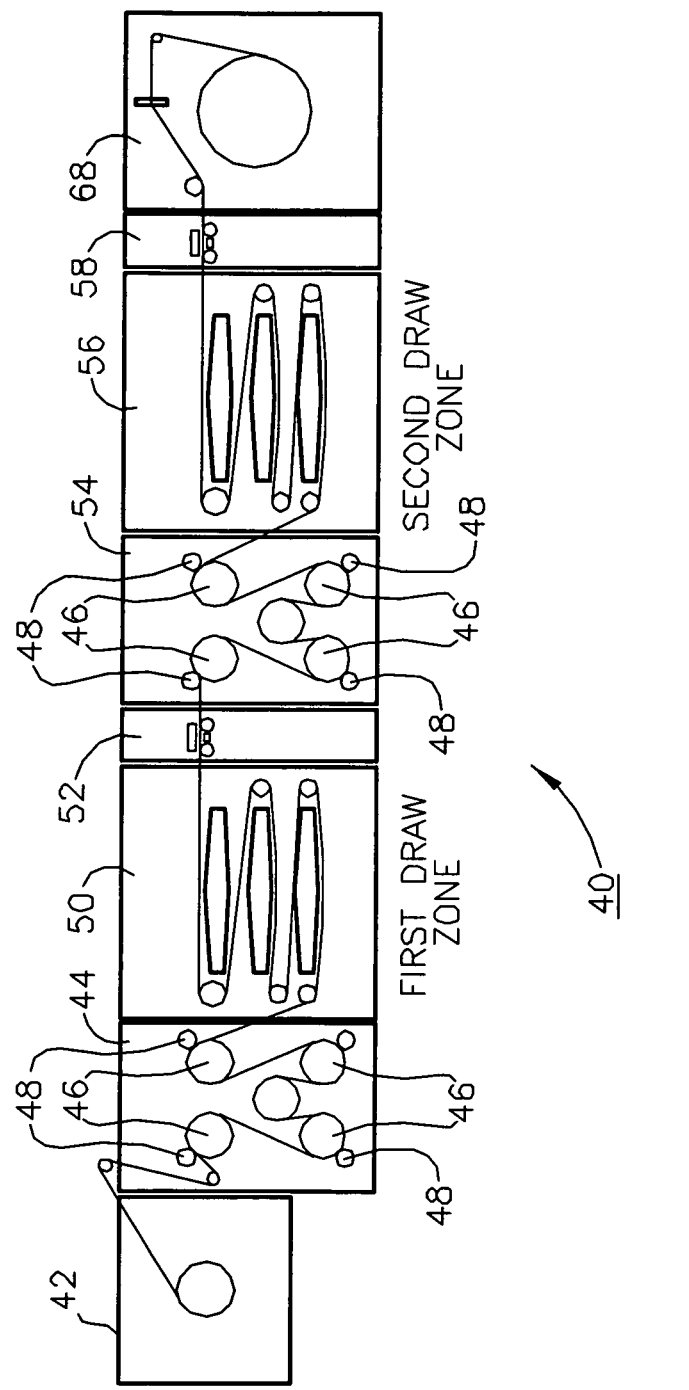
FIG. 2 is a schematic diagram of a preferred embodiment of the apparatus used to implement the drawing portion of the preferred process of the present invention.

Referring now to FIG. 2, the drawing apparatus utilized to achieve the thickness reductions of the coherent sheet produced as just described that result in production of the preferred UHMWPE products of the present invention 10 comprises:

a payoff 42, a godet stand 44 including heated godet rolls 16 (to anneal the product) and nip rolls 48 for establishing and maintaining tension in the line, a first draw zone 50, a first in-line tension sensor 52, a second godet stand 54, a second draw stand 56, a second in-line tension sensor 58, a third godet stand 60 and according to the preferred embodiment, a fibrillation unit 62, a nip roll stand 64 for maintaining tension and godet station 66 comprised of unheated take-up rolls 68. As seen from FIG. 1, the input or starting material of this process is generally the thick, compacted and rolled but unoriented product of the compaction step of the prior art production process. According to the preferred process of the present invention, the input or starting material in the drawing/calendaring process steps described below is, of course, coherent sheet 28 that emerges from gap 22 in the process described above.

Each of the elements of the apparatus just described and utilized in the successful practice of the present invention are well known in the film and fiber drawing arts as is their combination in a line of the type just described. Consequently, no detailed description of such a line is required or will be made herein and the reader is referred to the numerous design manuals and descriptions of such apparatus commonly available in the art.

Maintaining a constant tension of between about 0.5 and about 5 g/denier, and preferably between about 0.8 and 3 g/denier during drawing is also important to the production of product having the required "thinness" and other enhanced properties specified herein. The term "denier" as used herein is defined as the weight in grams of 9000 meters of the product film, tape, sheet or fiber. At tension levels below 0.5 g/denier no significant drawing or reduction will be obtained while at tension levels above about 5 g/denier the material will tend to separate. In the case of drawing, tension is a function of the feed polymer and can vary broadly depending thereon and the ranges just specified refer to those found useful with particular preferred UHMWPE commercial starting materials.

Total reductions achieved during drawing and calendaring will generally be between about 50:1 and about 170:1 or more depending again upon the input raw material and the end use to which the product is to be applied. Such total drawing and calendaring is computed as the multiple of each of the individual reductions achieved by each of the combined process steps.

According to a highly preferred embodiment of the present invention, drawing is performed in line with direct rolling as described hereinabove. In such a continuous process, calender rolls 24 and 24A become payoff 72 of drawing apparatus 70. Such an arrangement provides a highly efficient method for practicing the novel production process of the present invention.

After thickness reduction by drawing in the apparatus shown in FIG. 2 according to the processing parameters just described, the UHMWPE films, sheets, fibers or tapes thus produced exhibit heats of fusion at or above about 243 joules/gram, tenacities in the range of from about 18 and 20 g/, tensile moduli between about 1200 and about 1800 g/d and elongations in the range of from about 1.6 to about 2.0 percent.

While the description herein is presented largely in the context of the advantages appurtenant to a method and apparatus for the production of highly oriented UHMWPE sheet, it will be readily apparent that the practices and apparatus described could be readily adapted to the production of other polyolefin materials such as polypropylene and lower molecular weight polyethylene, for example, polyethylene having a molecular weight in the range of 800,000 and above.

There have thus been described novel processes for the production of coherent polyolefin, preferably UHMWPE, sheet and high tenacity, highly oriented polyolefin, preferably UHMWPE, sheet, film, tape or fiber that eliminates the need for the prior art compaction step which, until the development described herein, was considered necessary for the successful production of such materials.

As the invention has been described, it will be apparent to those skilled in the art that the same may be varied in many ways without departing from the spirit and scope of the invention. Any and all such modifications are intended to be included within the scope of the appended claims.

What is claimed is:

1. A process for the production of high tenacity, highly oriented polyolefin sheet having a high heat of fusion comprising:
 a) feeding a metered amount of a ultra high molecular weight polyethylene (UHMWPE) powder to an apparatus comprising:
  i) a pair of vertically oriented, counter rotating heated calender rolls defining a nip therebetween and including a top and a bottom heated calender roll, the top heated calender roll having an outer surface and an apex; and
  ii) a metering mechanism for feeding a metered amount of the polyolefin powder to the apex wherefrom the polyolefin powder softens and agglomerates on the outer surface of the top roll and is drawn on the outer surface of the top roll to the nip by rotation of the top roll from the apex of the top roll surface to the nip;
 b) rolling the polymer powder through the nip under these conditions until a coherent polyolefin sheet is produced;
 c) once a coherent polyolefin sheet exits the nip, adjusting the temperature in the nip to a temperature between 12 degrees C. lower to 8 degrees C. greater than the temperature required to initiate the onset of melting for the particular polyolefin powder being processed as determined by differential scanning calorimetry; and
 d) drawing the coherent polyolefin sheet under controlled tension at a temperature of between 140 and 158° C. to produce a high tenacity, highly oriented polyolefin sheet having a high heat of fusion.

2. The process of claim 1 wherein the UHMWPE powder exhibits a crystallinity of greater than 80% as determined by differential scanning calorimetry, a heat of fusion equal to or greater than 220 joules/gram, and low levels of entanglement.

3. The process of claim 2 wherein the temperature in step c is between 130° C. and 145° C.

4. The process of claim 2 wherein the operating temperature in step c is between 8 degrees C. lower and 4 degrees C. higher than the onset of melt for the particular UHMWPE powder being processed as determined by differential scanning calorimetry.

5. The process of claim 4 wherein the operating temperature in step c is between 2 degrees lower C and 2 degrees C.

higher than the onset of melt for the particular UHMWPE powder being processed as determined by differential scanning calorimetry.

6. The process of claim 3 wherein the counter rotating calender rolls rotate at a rate of between 2 and 12 meters/minute.

7. The process of claim 1 wherein drawing is performed in-line and continuously with the formation of the coherent sheet and said sheet includes a heat of fusion of greater than 243 joules/gram, a density of 0.95 to 0.98 g/cc, a tensile modulus of 1200 to 1800 g/d, and an elongation of 1.6 to 2.0 percent.

* * * * *